United States Patent [19]

Friess

[11] 4,247,079

[45] Jan. 27, 1981

[54] ANNULAR VALVE SEATING

[75] Inventor: Jean Friess, Clermont en Argonne, France

[73] Assignee: Societe Meusienne de Realisations Mecaniques "Realmeca", Clermont en Argonne, France

[21] Appl. No.: 73,072

[22] Filed: Sep. 6, 1979

Related U.S. Application Data

[63] Continuation of Ser. No. 801,365, May 27, 1977, abandoned.

[51] Int. Cl.³ .................... F16K 1/226; F16K 25/00
[52] U.S. Cl. .................... 251/174; 251/306; 251/317; 251/334
[58] Field of Search .............. 251/174, 192, 306, 317, 251/334, 365

[56] References Cited

U.S. PATENT DOCUMENTS

| 3,077,331 | 2/1963 | Burtis | 251/174 |
|---|---|---|---|
| 3,077,332 | 2/1963 | Burtis | 251/174 |
| 3,153,427 | 10/1964 | Burtis | 251/174 |
| 3,394,915 | 7/1968 | Gachot | 251/174 |
| 3,563,510 | 2/1971 | Priese | 251/306 |
| 4,005,848 | 2/1975 | Eggleston | 251/317 |
| 4,044,994 | 8/1977 | Priese | 251/174 |
| 4,071,220 | 1/1978 | Iino | 251/174 |

FOREIGN PATENT DOCUMENTS

| 2064057 | 7/1972 | Fed. Rep. of Germany . | |
| 2056552 | 5/1971 | France . | |
| 2151186 | 4/1973 | France . | |
| 2224029 | 10/1974 | France . | |
| 2232235 | 12/1974 | France . | |
| 2331725 | 6/1977 | France | 251/306 |

Primary Examiner—William R. Cline
Assistant Examiner—H. Jay Spiegel
Attorney, Agent, or Firm—Young & Thompson

[57] ABSTRACT

The invention provides an annular seating, for valves and cocks comprising a body formed with an axial duct and a movable closure member having a bearing surface associated with the seating. The seating has a metal casing having a hollow cross-section having an anchor part adapted to be held in a recess of the body and an annular closure part having an annular contact surface adapted to co-operate resiliently with the annular bearing surface of the closure member when the seat is in the operating position.

10 Claims, 16 Drawing Figures

ANNULAR VALVE SEATING

This is a continuation of application Ser. No. 801,365, filed May 27, 1977, now abandoned.

The invention relates to an annular seat, inter alia for valves and cocks, comprising a body formed with an axial duct and a movable closure means having an associated annular surface and adapted to abut the seat.

There are various known seats of the aforementioned kind, which can be constructed from various materials and are adapted to various special operating conditions, so as to obtain good sealing-tightness and ensure that the movablee closure means operates very smoothly.

However, it is difficult to obtain the desired prolonged sealing-tightness and smooth operation with known seats, more particularly in valves and cocks subjected to severe temperature and pressure conditions.

Difficult compromises have to be made in order to satisfy a number of contradictory conditions. Clearly, in order to achieve sealing-tightness, the associated bearing surfaces of the seat and closure means must have an excellent surface state. It must be possible to preserve the surface state for a prolonged period. Furthermore, sealing-tightness in the closure position is better in proportion to the bearing pressure between the bearing regions of the seat and closure member. This is particularly the case when the fluid to be controlled is itself at a fairly high pressure.

However, in a valve or cock subjected to repeated opening or closure movements, the desirable sealing qualities cannot be obtained simply by exerting a high bearing pressure on the seat. Smooth operation is also an important requirement.

If a high bearing pressure is exerted on the seat, the force required to operate it is often excessive near the closure position. In addition, the high bearing pressure tends to damage the bearing surfaces, since oblique sliding under pressure between the movable closure means and the seat occurs almost inevitably. In the case, for example, of a butterfly valve or ball cock, the direction of sliding under pressure, at each of the contact points, is substantially at a tangent to a spherical surface centered along the axis of rotation of the butterfly valve. This direction, therefore, varies along the periphery of the seat. It is almost parallel to the axis of the annular seat in the case of contact points which are remote from the butterfly rotation axis, but is substantially perpendicular to the axis of the annular seat at points of contact near the butterfly rotation axis. This sliding, in various directions, subjects the seat to operating conditions which are variously distributed and very unfavourable to prolonged life in the case where the valve or cock is repeatedly operated. The aforementioned sliding in various directions can be reduced to some extent by certain complex, expensive mechanisms, but they are not economic for valves and cocks of the kind in question. In any case, deterioration of the seat bearing surface, and even of the associated surface of the closure means, is generally accelerated by a throttling effect of the fluid to be controlled, more particularly at high or very low temperatures.

Furthermore, more particularly in the case of large-calibre valves and cocks (e.g. above 100 mm) it is difficult, using known seats, to ensure that the bearing pressure of the closure means is regularly distributed over the periphery of the annular contact region of the seal.

A local anomaly in the bearing pressures, e.g. as a result of a variation in temperature, is sufficient to start creep or erosion at a point on the seat or on the associated surface of the closure means. The result is an initial sealing defect, which becomes worst each time the closure means is actuated or if the flow rate is adjusted to a small amount.

The result, quite soon, may be a loss of sealing-tightness of the valve or cock, frequently accompanied by more or less complete jamming of the closure means, inter alia near the normal closure position. In the case of a butterfly valve, jamming frequently occurs remote from the axis, in the place where the closure means has the widest range of spring movement.

The aforementioned disadvantages and difficulties, which are particularly noticeable under extreme temperature or pressure conditions, occur e.g. in annular valves and seats of the kind disclosed in French Patent Specification No. 2,056,552 comprising elastomer elements which are not fire-resistant.

The aforementioned sealing and jamming difficulties frequently have serious consequences, e.g. in industrial installations comprising a large number of automatic remote-controlled valves and cocks, with very strict safety requirements. Contact installations of the aforementioned kind frequently have to treat dangerous or harmful fluids having a physical nature which still further aggravates the sealing and jamming difficulties occurring in known seats—e.g., in the case of chemical factories, refineries and depots for oil products, or establishments for processing liquid gases such as natural gas, hydrogen or helium at very low temperatures.

An object of the invention is to obviate the aforementioned difficulties by providing an economic, rugged seat ensuring prolonged sealing-tightness and smooth operation or valves or cocks equipped with such seats, even in the case of dangerous or corrosive fluids and very low or very high temperatures, more particularly for ensuring that the valve is fireproof.

The invention relates to an annular seat, more particularly for valve and cocks, comprising a body formed with an axial duct and a movable closure means having an annular bearing surface associated with the seat, the seat having a metal casing having a hollow cross-section and an anchor part adapted to be gripped and held in a recess in the body and at least one annular closure part having an annular contact surface adapted to co-operate resiliently with the annular bearing surface of the movable closure means, when the seat is in the operating position.

According to the invention, the aforementioned seat is characterised in that the casing has a substantially circular discontinuity near but outside its annular contact surface, the discontinuity being centred along the axis of the duct in the operating position of the seat, so as to improve the resilience of the casing co-operating with the bearing annular surface of the closure means in the radial direction with respect to the aforementioned axis of the body.

As will be explained hereinafter, the circular discontinuity of the casing, near its surface of contact with the closure means, ensures that the casing has the strength necessary, more particularly, for ruggedness and prolonged efficiency, but also has the local flexibility and resilience required for smooth operation of the closure means, so as to ensure excellent sealing-tight contact between the annular seat and the closure means in the closed position.

Since the anchor part of the metal casing is held in position, the annular contact surface of the closure part is accurately positioned with respect to the movable closure means. In this manner, the two associated bearing means of the seat and closure means can slide obliquely in co-operation, in a prolonged, repeated manner. As will be shown hereinafter, there are a number of metods of constructing the anchor part and the closure part for accurately securing the anchor part while giving the necessary freedom to the closure part. In addition, the metal casing can easily be given a surface quality which is advantageous with regard to the efficiency and ruggedness of the seat.

The seat according to the invention is preferably applicable to butterfly valves and ball cocks in which the closure means rotates around an axis parallel to but at a certain distance from the central plane of the seat. In the case of a butterfly valve, the closure means is preferably a portion of a sphere centred on the axis of rotation. In devices of the aforementioned kind, as already mentioned, the motion of the closure means subjects the seat to complex asymmetrical stresses resulting in deformation of the seat which is out of all proportion with the deformation resulting from the engagement of a closure means which moves coaxially with respect to the seat.

The stresses on the seat during operation, under the preferred conditions of application according to the invention, are also very different from the conditions of the seat if used as a static seal, even assuming that it undergoes alternate clamping and release.

In a first embodiment of the seat according to the invention, the casing has a substantially square cross-section having one space on the side of the anchor part and an opposite space corresponding to the annular contact surface. With a view to assembly in the axial duct of a butterfly valve, the contact surface of the seat adapted to co-operate with the annular bearing surface of the butterfly valve has a flared portion opening towards the butterfly when the seat is in the operating position. Preferably, the flared portion is substantially between 20° and 40°.

As explained hereinafter, these features provide an economic, rugged seat, adapted to the special case of a butterfly valve.

Preferably, the hollow sectional metal casing of the seat contains a filling element, e.g. comprising compressed asbestos fibres.

According to another embodiment, which is also applicable to assembly in the axial duct of a butterfly valve, the anchor part of the casing has a substantially rectangular cross-section, adapted to be clamped between a shoulder of the duct and an axial tubular end of a clamping collar when the seat is in the operative position; the closure part of the casing has a rounded cross-section connected to the square cross-section of the anchor part.

Preferably, the rectangular cross-section of the anchor part extends at an angle to the axis of the annular seat; preferably also, a reinforcing ring having a substantially rectangular cross-section is disposed in the casing anchor part.

These features provide an anchor part having minimum bulk but the necessary rigidity and efficiency, with a view to accurate positioning of the closure part, which has a rounded cross-section for obtaining the desired relative flexibility.

Advantageously the closure part having a rounded cross-section has a curved edge adapted to bear on an edge of the anchor-part reinforcing ring. The closure part can contain a helical frame having close-set turns.

As explained hereinafter, these features provide an advantageous method of adjusting and localizing the flexibility of the casing closure part in the contact region thereof.

In an advantageous embodiment of the seat according to the invention, inter alia for a ball cock, the casing has two annular closure parts each having an annular contact surface; one part is adapted to bear on the movable closure means of the ball cock whereas the other bears opposite a transverse flange of a pipe adjacent the cock, when the seat is in the operating position. The two annular closure parts are coaxial and interconnected by a coaxial common annular anchor part.

Preferably the common anchor part has a cross-section comprising two substantially square portions each connected to the cross-section of one of the closure parts. At least one closure part has a rounded cross-section and an edge adapted to abut an edge of a sectional reinforcing ring mounted inside the cross-section of the anchor part.

These features can be used to obtain a convenient, economic combined seat, as explained hereinafter.

Other features and advantages of the invention will be clear from the description of some embodiments, given hereinafter by way of non-limitative example with reference to the accompanying drawings, in which.

Figures 1, 2, 4, 5:
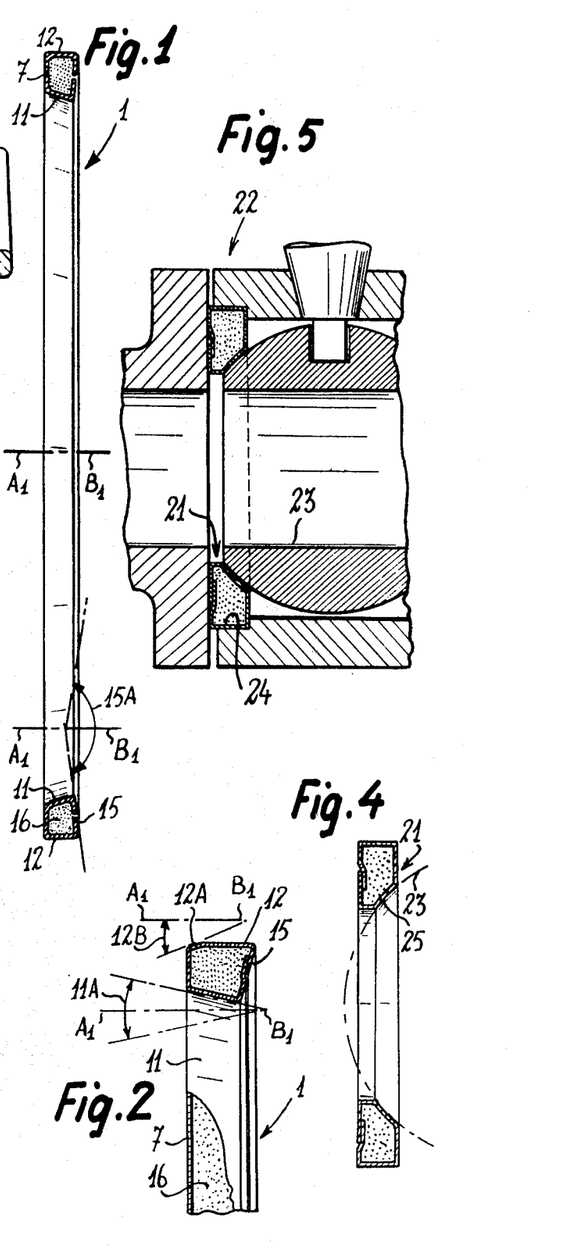
FIG. 1 is a diametric section of a seat according to the invention.
FIG. 2 is an enlarged view in section of the top part of FIG. 1, giving a detailed view of the cross-section of the seat casing.
FIG. 4 shows a second embodiment of the seat.
FIG. 5, corresponding to FIG. 3, shows the seat in FIG. 4, incorporated in a ball cock.
Figure 3:
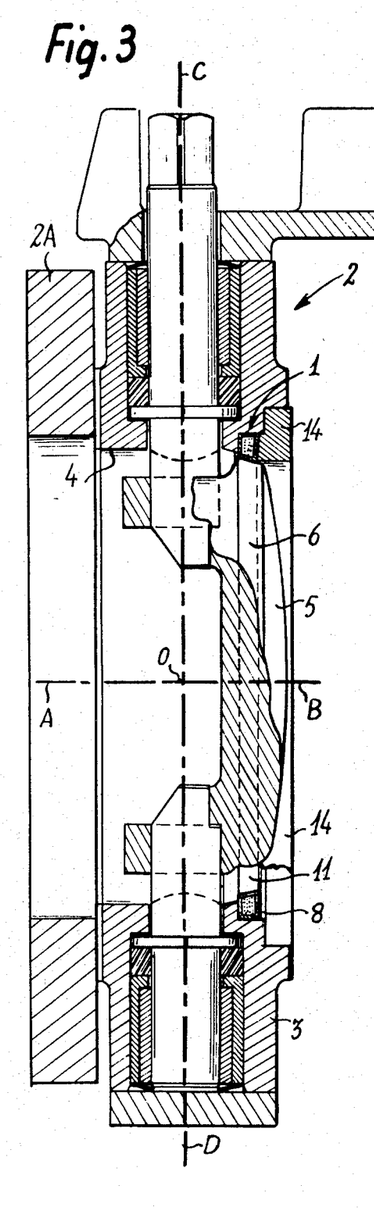
FIG. 3 is a section of a butterfly valve containing a seat according to FIG. 1.

FIGS. 1 and 2 show an embodiment comprising an annular seat 1 adapted e.g. for a butterfly valve 2, as shown in FIG. 3, designed for fitting to flanges such as 2A of two adjacent pipes (not shown). Valve 2 has a body 3 formed with a duct 4 having the axis A–B and a movable butterfly 5 rotatable around an axis C–D which is transversal with respect to axis A–B and offset with respect to the centre plane of butterfly 5. Butterfly 5 has an annular bearing surface 6 associated with seat 1.

Seat 1 has a metal casing 7 having a hollow cross-section, comprising an anchor part adapted to be clamped and held in a recess 8 of body 2, and an annular sealing part having an annular contact surface 11 adapted to co-operate resiliently with the annular bearing surface 6 of butterfly 5, when seat 1 is in the operating position (FIG. 3).

According to the invention, casing 7 has a substantially circular discontinuity near but outside its annular contact surface 11, the discontinuity being centred along the axis of the duct in the operating position of the seat, so as to improve the resilience of casing 7 co-operating with the annular bearing surface 6 of closure means 8 in the radial direction with respect to axis A–B.

As shown in FIGS. 1, 2 and 3, the aforementioned discontinuity of the metal casing 7 is made up of two lips on the casing, facing a transverse bearing surface 15 of the seat (described hereinafter) or alternatively the discontinuity is a shoulder seal constructed on the aforementioned transverse surface, the thus-connected lips being allowed to slide over one another in the radial direction.

Preferably (FIG. 1), casing 7 has a square cross-section having a base 12 on the side of the anchor part, opposite a base corresponding to the annular contact surface 11. Surface 11 is substantially conical and coaxial with the axis A1–B1 of the annular seat. It also has a flared portion 11A (FIG. 2) which opens from the side of butterfly 5 when seat 1 is in the operating position. Advantageously, portion 11A is at an angle substantially between 20° and 40°.

The base 12 of the anchor part of seat 1 may advantageously have a bevelled surface 12A (FIG. 2) on its edge adapted to be mounted in the direction of butterfly 5. Surface 12A is e.g. substantially conical and forms an angle 12B of the order of 15° with respect to the axis A1–B1 of the annular seat 1. The bevelled surface 12A facilitates shaping of the seat casing 7, in the anchor part, and gives greater flexibility to the contact surface 11.

The anchor part of seat 1 (FIG. 1) is adapted e.g. to be clamped in pipe 4 between a shoulder of recess 8 and a clamping ring 14, mounted opposite butterfly 5 with respect to seat 1. The aforementioned anchor part, opposite the clamping ring 14, has a transverse anchor surface 15 having a flared portion 15A opening on the side of the clamping ring 14 in the operating position of seat 1 (FIGS. 1 and 3). Advantageously, portion 15A of surface 15 widens substantially between 150° and 170° (FIG. 1).

As shown in FIG. 1, the anchor surface 15 of seat 1 has two substantially contiguous adjacent edges, thus giving some flexibility to surface 11. Alternatively (FIG. 4) anchor surface 15 can have two contiguous edges covered at least by a shoulder of the edge associated with the contact surface 11.

Advantageously casing 7 is manufactured e.g. from stamped stainless steel ribbon and comprises a filling element 16, e.g. comprising compressed asbestos fibres. The resulting seat 1 is extremely fire-proof, since casing 7 and filling element 16 can withstand a very high temperature without being destroyed.

In the case of a valve 2 having a duct 4 which is e.g. 150 mm in diameter, the seat 1 according to the preceding description is e.g. 7 mm thick in its axial direction A1–B1 (FIG. 1) and about 10 mm in the radial direction. The stainless steel casing 7 has a thickness e.g. of the order of only 0.5 mm.

Preferably, the contact surface 11 associated with the annular bearing surface 6 is given finishing treatment, to ensure that surface 11 has excellent sealing-tightness and that the butterfly valve operates very smoothly. The treatment can consist in polishing the stainless steel surface contact 11, combined e.g. with polishing the bearing surface 6, which is made of a different quality of cast steel.

The contact surface 11 of seat 1 can also receive other treatment, comprising e.g. deposition of a plastics coating, inter alia based on fluorocarbon resins, a few tenths of a millimeter thick. At very low temperatures e.g. down to approximately −180° C., the coating used is preferably based on high-density polyethylene or a fluoroethylene-propylene polymer. In the case of less intense cold, e.g. of the order of −40° C., the coating may advantageously be based on polytetrafluoroethylene or a trifluoromonochloroethylene polymer. Under the aforementioned temperature conditions, these coatings have advantageous self-lubricating properties.

On the other hand a seat adapted to operate at high temperature, e.g. up to +300° C., may be given a metal deposit on the surface contact 11, e.g. by hard chromium plating or by spattering a refractory alloy—inter alia nickel-based—using a torch. Surface 11 may also be nitrided. If necessary, the aforementioned hard coatings are associated with precision machining followed by polishing, so that surface 11 can be exactly shaped, so that the cross-section is e.g. conical, slightly cambered, concave or convex.

Of course, the same kind of coating and finishing treatment can be applied to the annular bearing surface 6, in combination with coating or treatment of the contact surface 11, or independently thereof.

We shall now describe the use and operation of the seat previously described with reference to FIGS. 1–3.

Seat 1 is positioned in recess 8 of duct 4 when the butterfly valve is open, by disposing the slightly flared anchor surface 15 on the side of the clamping ring 14 remote from butterfly 5. Anchor surface 15 is clamped e.g. by screws (not shown) acting radially on ring 14. Ring 14 can also be subjected to axial bearing stress by an adjacent flange such as 2A, to which valve body 3 is secured by bolts or tie rods (not shown).

When the anchor part is thus clamped on the side of its base 12 (FIGS. 1 and 2) seat 1 is precisely positioned in recess 8 with respect to the annular bearing surface 6 of valve 5 in the closed position. Of course, the exact dimensions of the substantially square-cross-section of casing 7 have been exactly adapted to the dimensions of recess 8, clamping ring 14, and the annular bearing surface of butterfly 5. More particularly, the exact outline of the cross-section of casing 7 is designed so as to project, e.g. a few millimeters, from the surface of contact 11 in duct 4.

Advantageously, for the purpose of mass production, the outline and exact dimensions of seats 2 are standardized in various calibres, depending on the standardized internal outlines of valves 2 of corresponding calibre.

If valve 5 is moved into the transverse closure position (FIG. 3), the annular bearing surface 6 bears on contact surface 11, projecting slightly radially in duct 4. The extent of projection (e.g. of the order of 2 or 3 mm) is determined with a very small tolerance, so that the contact surface 11 can be resiliently compressed to a certain extent at the end of the closure movement of butterfly 5.

The very low tolerances for machining recess 8 in valve 2, and the equally low tolerances for manufacturing casing 7 (FIG. 2) ensure high accuracy, e.g. of the order of 0.2 mm, for the positioning at rest of the contact surface 11 mounted in valve 2. Accordingly the amount of compression of surface 11 can be very small, e.g. of the order of 1 mm only.

Consequently, and owing to the flexibility of casing 7 in the region of and near surface 11, any excess or defficiency in the bearing pressure is avoided at all points on the annular contact surface 11 during the closing movement of the valve.

Thanks to the invention, the resilience of casing 7 is substantially improved in the radial direction owing to the circular discontinuity provided in casing 7 near its annular surface 11 co-operating with the annular bearing surface 6 of closure means 5, in the radial direction with respect to axis A–B of body 1. (FIGS. 1–3).

Thus, the casing 7 can be relatively thick and strong (e.g. of stainless steel) and thus remain efficient for a prolonged period. However, the active part of casing 7, i.e. the annular contact surface 11, may also, thanks to the invention, have all the local flexibility and resilience required for smooth operation of valve 5 and for excellent sealing-tight contact between annular seat 1 and butterfly 5 in the closed position (FIG. 3).

Equal distribution of bearing pressure over the entire periphery of surface 11 is also facilitated by the flared portion 11A (FIG. 4) which is advantageously associated with a corresponding oblique portion of the cross-section of surface 6. For example, surface 6 can be machined and ground to a spherical cross-section centred at the point of intersection "O" of axis A–B of pipe 4 and the axis of rotation C–D of valve 5. If surface 11 of seat 1 is given a smaller camber than surface 6, or even a slight camber in the opposite direction, surfaces 6 and 11 can slide more easily over each other and remain exactly in contact over the entire periphery of valve 5, when in the closed position, with an exact pressure being exerted on surface 11.

The minimum value of the closure torque applied to the actuating rod is directly related to the pressure exerted on the contact surface 11. The pressure depends inter alia on the thickness and rigidity of casing 7 in the region of surface 11, and on the amount of compression of the filling element 16 at the time when the seal is manufactured. Other factors are the extent to which surface 11 projects radially into duct 4, its camber, if any, and the amount of elastic crushing of surface 11 (e.g. 1 mm) at the end of the closing movement of butterfly 5.

The careful surface finishing of surface 11 ensures that the closed valve has excellent sealing-tightness, with quite moderate crushing pressure. This is because the firm anchoring of seat 1 and the very reduced manufacturing tolerances thereof, owing to the manner of constructing casing 7, ensure that surface 11 is reliably and accurately positioned with respect to surface 6. However, surface 11 has a certain amount of resilience, which is exactly adapted to the estimated crushing and the desired bearing pressure.

Experience has also yielded an unexpected result, i.e. the composite-structure seat according to the invention has remarkable resistance to asymmetrical friction caused by angular motion of the closure means during the closing or opening operations, and resulting in shear forces on the seat, as will be explained in greater detail hereinafter.

The aforementioned forces are so complex that the performance in operation of a seat having a given structure cannot be predicted.

Under particular operating conditions at high or very low temperatures, finishing or coating, if required, of the contact surface 11 improves the efficiency and ruggedness of seat 1 by eliminating the risk of jamming.

The oblique shape of the bearing portion of surface 6 on surface 11 advantageously ensures that the desired crushing pressure is applied in the two regions of surface 6 adjacent the butterfly rotation axis C–D. Owing to this oblique shape, the rotation of butterfly 7 at the end of its closing motion results in radial stress imposed on surface 11, even near axis C–D (FIG. 3). Owing to the accuracy with which surface 11 is positioned according to the invention, full use can be made of the advantageous obliqueness of surface 11.

The previously-mentioned seat has a number of important advantages.

It offers high protection against fire, since the metal casing 7, e.g. of stainless steel, can withstand high temperatures without being destroyed. The same applies to body 3 of valve 2 and to the filling element 16, which can e.g. comprise asbestos fibre.

As already explained, surface 11 can be accurately positioned owing to the accurate manufacture of seat 1, resulting from the construction of casing 7, which is manufactured e.g. by stamping with accurate tools. The result is that surface 11 is crushed to a small, exactly determined extent, corresponding to a bearing pressure which is accurately determined and regularly distributed over the entire periphery of surface 6. The bearing pressure remains constant during the entire service life of the seat.

As already explained, the circular discontinuity of casing 7, e.g. the two facing lips of lateral surface 15 (FIG. 1) or a shoulder joint of the aforementioned lips (FIG. 2) substantially improves the radial resilience of surface 11 co-operating with surface 6, in the radial direction with respect to axis A–B of seat 1 and of body 2.

Consequently, casing 7 can have a relatively great thickness, which improves its strength and efficiency and prolongs its life. It can also be made of a relatively rigid material such as stainless steel. However, surface 11 has excellent radial flexibility and great resilience, owing to the smoothness of operation of valve 5 and the sealing-tightness of contact of seat 1 on valve 5 in the operating position.

Thus, casing 7 can have a relatively great thickness, which improves its strength and efficiency and prolongs its life. Likewise, casing 7 can be made of a material such as stainless steel, which is relatively rigid but very strong. However, according to the invention, surface 11 still has excellent radial flexibility and great resilience owing to the smoothness of operation of valve 5 and the good and prolonged sealing-tightness of the contact between seat 1 and valve 5 in the operating position.

This advantageous fundamental feature of the invention eliminates any uncertainty with regard to the bearing pressure actually exerted on seat 1. Furthermore, the finishing treatment or coating of surface 11 ensures that the bearing portion has good sealing-tightness and the bearing surface 6 slides smoothly on surface 11.

Thus, the bearing pressure can be exactly adjusted and maintained for a prolonged period, thus improving the reliability and ruggedness of the valve equipped with seat 1 according to the invention. Thus, the force needed to operate it is reduced by a very considerable proportion.

Of course, the invention is not limited to the embodiment described by way of example, but can be varied in numerous ways without departing from the invention.

FIGS. 4 and 5 show a second embodiment of the seat 21 according to the invention, adapted to be fitted in a ball cock 22 comprising a rotating, e.g. spherical, closure member 23. In the same manner as for seat 1 in FIGS. 1 to 3, the casing of seat 21 has an anchor part, e.g. having a rectangular cross-section, adapted to be fitted into a recess 24 in cock 22.

As in the case of casing 12 in FIG. 3, a circular discontinuity is produced in the casing of seat 21, near but outside the annular contact surface 25. The aforementioned circular discontinuity (FIG. 4) comprises e.g. a shoulder seal having two lips adjacent a lateral surface of seat 21.

The annular contact surface 25 of the casing of seat 21 has a concave, e.g. substantially spherical, cross-section adapted to the shape of the rotating closure means 23. Of course, the annular contact surface 25 and the ball can be given various finishing treatments, inter alia hardening, for improving the sealing-tightness and smoothness of the sliding bearing portion of closure means 23, as already explained.

FIGS. 6–8 and 13, 14 show a third embodiment of the seat 31 according to the invention, adapted e.g. to be mounted in a valve 32 comprising a butterfly 33, similar to valve 2 in FIG. 3. The anchor part 34 of the casing of seat 31 has a substantially rectangular cross-section, adapted to be clamped between a shoulder 35 of the duct of valve 32, and an axial tubular end of a clamping collar 36, when seat 31 is in the operating position. The closure part 37 of seat 31 has a rounded e.g. substantially circular cross-section, connected to the rectangular cross-section of anchor part 34.

Preferably, the rectangular cross-section of part 34 extends transversely to the axis A1–B1 of seat 31, thus ensuring excellent clamping of part 34 and minimum axial bulk of the seat in its recess against shoulder 35.

Advantageously, to increase the rigidity of anchor part 34, a metal ring 38 (FIG. 7) having a rectangular cross-section adapted to that of the casing, is fitted in the anchor part 34. In that case, closure member 37 can have a curved edge 37A adapted to bear on an edge of metal ring 38. Ring 38 is made e.g. of steel, having the appropriate quality for the operating conditions of seat 31.

Figures 6, 7:
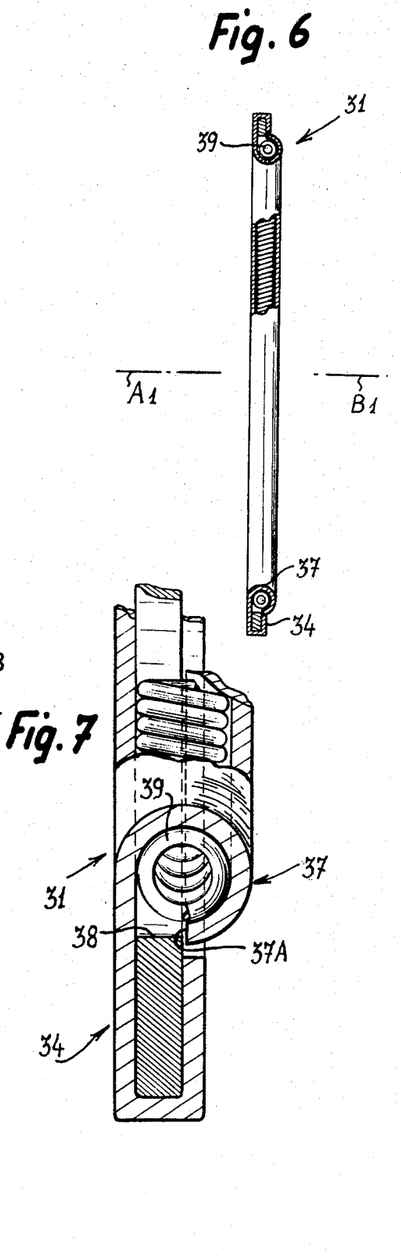
FIGS. 6–8, which correspond to FIGS. 1–3, show a third embodiment of the seat and the fitting thereof in a butterfly valve.
Figure 8:
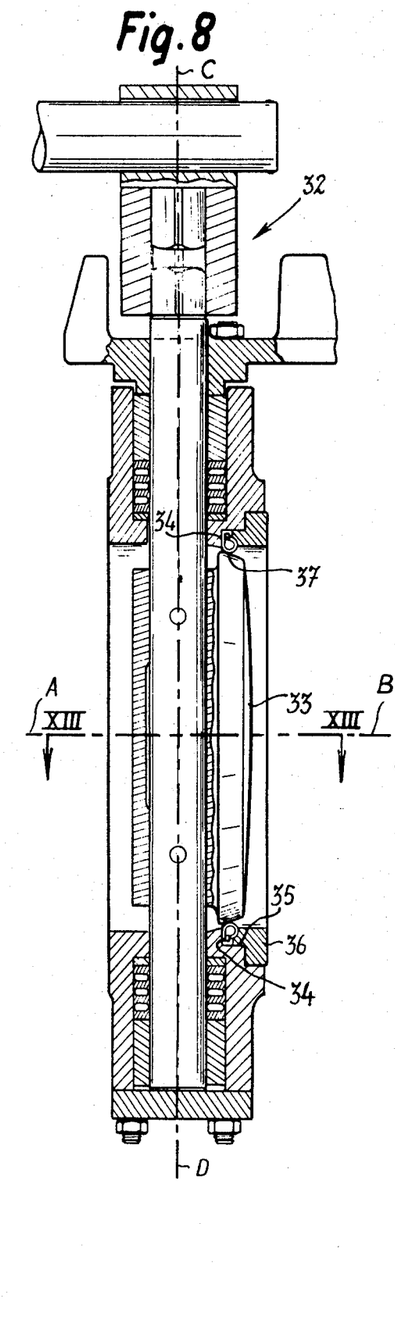

As shown in FIG. 7, the circular discontinuity of casing 31, centred on axis A–B of the body of valve 32 and seat 31 in the operating position, is provided by the clearance, in the inoperative position, between the curved edge 37A of the closure part 37 and the casing anchor part 34, and similarly with respect to the metal ring 38.

We have already explained the advantage of the aforementioned circular discontinuity of casing 37 near but outside the surface of contact with butterfly 33, to improve the sealing-tightness of valve 32 in the closure position and its smoothness of operation and the prolonged life of seat 31.

Experience has shown the importance of the clearance, in the inoperative position, between the closure part 37 and the sectional part 36a (having a substantially toric cross-section).

The clearance permits resilient deformation of part 37 but limits it from a certain threshold where part 37 is being subjected to crushing, when the free projection of part 37 presses on metal ring 38, thus sealing the space inside the seat.

In the embodiment in FIGS. 6 and 7, seat 31 may advantageously comprise a helical metal frame 39 having close-set coils, e.g. made of spring steel, fitted in the annular sealing part 37, which is given a rounded cross-section, e.g. by circular shaping.

Owing to the helical frame 39 in the annular closure part 37, the casing of seat 31 can be made relatively thin, of the order of e.g. only 0.5 mm for a seat having a calibre of 150 mm. Owing to this thinness, the casing has improved local flexibility, but the inner helical frame 39 resiliently maintains the rounded cross-section of closure part 37 with the desired general rigidity. Suitable adaptations are made to the diameter of the rounded cross-section of part 37 and the calibre of the turns of frame 39.

Figure 13:
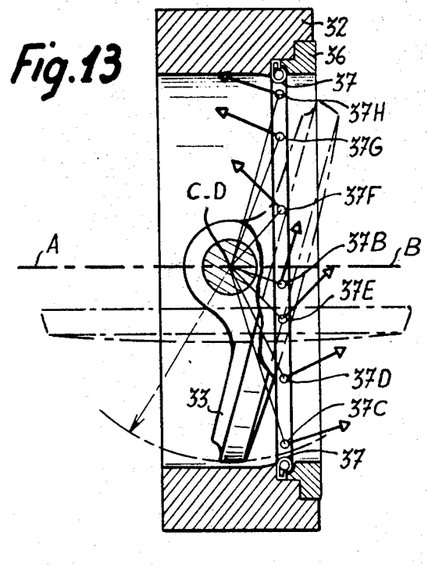
FIG. 13 is a cross-section of FIG. 8 along XIII—XIII when the butterfly valve is in an incompletely closed position.
Figure 14:
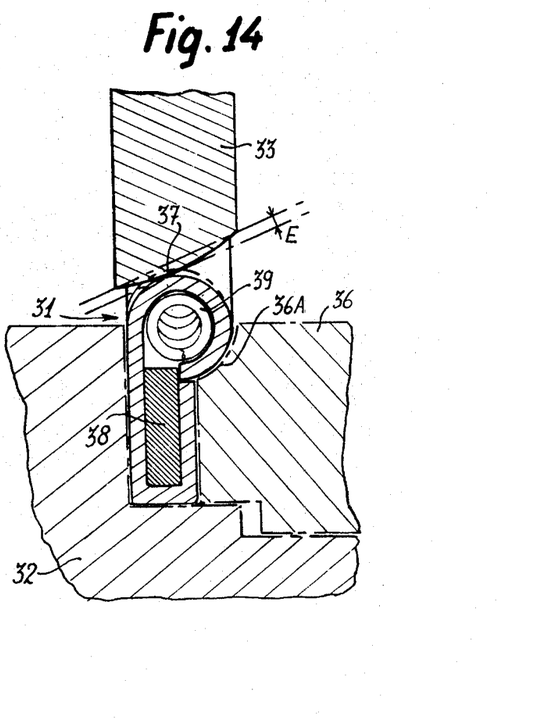
FIG. 14 shows an enlarged detail of FIG. 13, in the butterfly closure position, showing how the seat closure part is pressed by the butterfly bearing surface.
Figure 15:
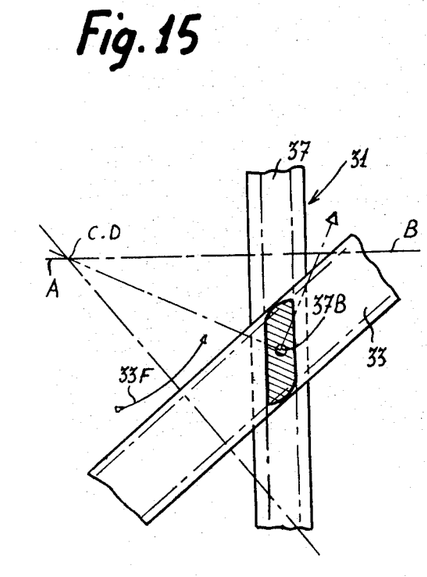
FIG. 15 is a diagram based on FIG. 13, showing the appearance of the contact region between the seat and butterfly, in the position where the butterfly is incompletely closed, and FIG. 16, which corresponds to FIG. 7, shows another variant of the seat according to the invention.

FIGS. 13–15 show the variation in the contact between part 37 and the associated edge of butterfly 33, which is rotatable around its axis C–D. In the incompletely closed position of butterfly 33, shown diagrammatically on FIGS. 13 and 15, contact occurs at two regions 37B which are symmetrical with respect to the plane of the drawing. Only one region 37B is shown in plane projection in FIG. 15. As a result of the crushing "E" of part 37 (FIG. 14) contact between 33 and 37 occurs along a strip of part 37 shown by chain-dotted lines in FIG. 15. Consequently, the diagrammatic projection of the contact region 37B between butterfly 33 and part 37 is substantially represented by a relatively elongated parallelogram defined by the intersection between the edge of butterfly 33 and the aforementioned crushing strip of member 37.

When butterfly 33 is further closed in the direction of arrow 33F (FIG. 15), the contact area 37B tends to widen and becomes symmetrical with respect to axis A–B of seat 31, until it fills the entire illustrated half of the contact surface of part 37. At the limit, i.e. the completely closed position of butterfly 33 (FIG. 8), the bottom and top contact areas join, assuring uniform distribution of crushing E (FIG. 14) over the entire periphery of seat 31.

During the progressive motion of the contact region 37B, which is shown by local bending and asymmetrical shearing forces on seat 31, the edge of butterfly 33 slides at various angles on part 37 (FIGS. 13, 15). Over a relatively large contact area such as 37B, the angle of slide at each point is defined by a tangent to the sphere of contact centred at axis C–D, the tangent also being transversal with respect to axis C–D.

Consequently, as shown diagrammatically in FIG. 3, the angle of slide on the contact area between 33 and 37 is different at various points on part 37, e.g. 37C, D, E, F, G and H. Consequently, the operating conditions for part 37 are very unequally distributed. However, part 37 is appropriately adapted thereto, owing to its resilience and accurate and stable positioning, ensured by the anchor part 34.

Advantageously, the accurate positioning and resilient behaviour of part 37 may be improved (FIG. 14) by a sectional part 36A of the clamping ring 36, adapted to retain the closure part 37 opposite the place of contact between parts 37 and 33. Thus, the rounded cross-section of part 37 becomes transversely oval during crushing "E", with a considerable resilient reaction.

The resilience of the casing of seat 31 is improved by the clearance provided, at rest, between the edge of closure member 37 and the adjacent parts, inter alia the reinforcing ring 38. We have already, in connection with FIGS. 1–7, pointed out the advantages resulting from this feature of the invention, with regard to the smooth operation of valve 32, its prolonged sealing-tightness during operation, and the ruggedness of seat 31.

Figures 9, 11, 12:
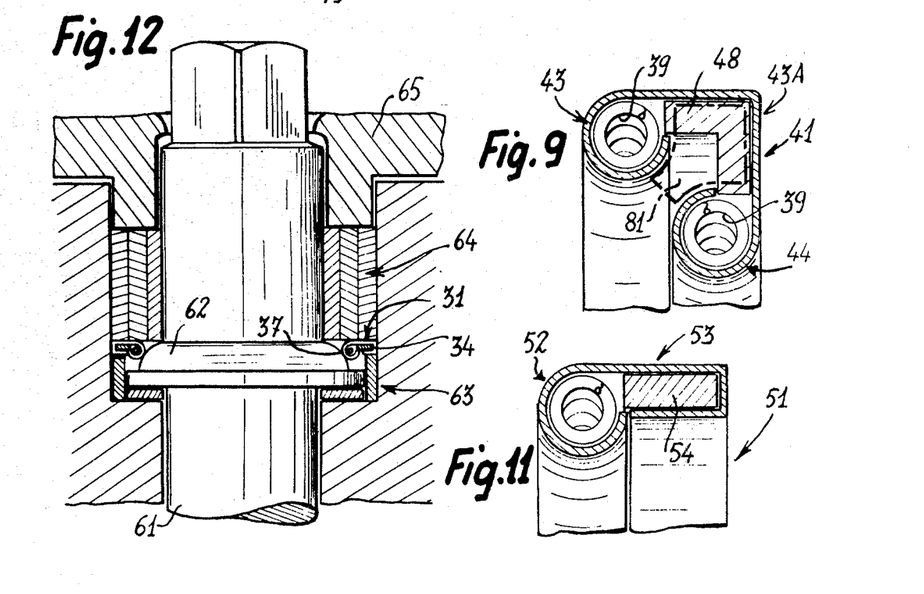
FIGS. 9 and 10 show a fourth embodiment of the seat and the fitting thereof in a ball cock.
FIG. 11 shows a variant of the seat in FIG. 9.
FIG. 12 shows another application of the seat in FIGS. 6 and 7 for ensuring sealing-tightness of a rotating rod.
Figure 10:
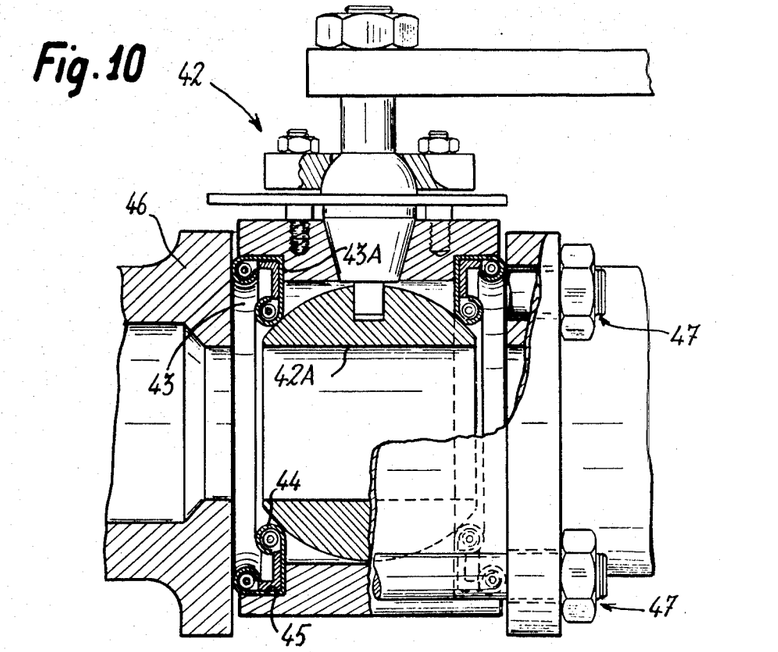

FIGS. 9 and 10 show a fourth embodiment of a seat 41 according to the invention, adapted e.g. for installation in a ball cock 42 having a rotating closure member 42A, similar to cock 22 in FIG. 5. The casing of seat 41 has two coaxial annular closure parts 43, 44, e.g. having a rounded cross-section, interconnected by a common coaxial annular anchor part 43A. Each annular closure part 42, 43 can have an inner helical frame 39 as described with respect to seat 31 in FIG. 7.

Seat 41 is adapted to be mounted in the operating position (FIG. 10) in an annular recess 45 of cock 42, when the annular closure part 43 is adapted to come opposite a transverse flange 46 of a pipe adjacent cock 42. The annular closure part 43 which, when at rest, projects with respect to the body of cock 42, can thus be resiliently crushed when the cock is secured to flange 46, e.g. by tie rods 47.

When seat 41 is in the operating position (FIG. 10) the other annular closure part 44 is adapted to bear against the movable closure member 42A of the cock. In order to improve sealing-tightness and the smoothness of the sliding bearing portion of closure means 42A on the closure surface 44, the surface may be given an appropriate coating or finishing treatment, as already described with reference to seat 1 in FIGS. 1 to 3.

Preferably, as shown in FIGS. 9 and 10, the anchor part 43A of the casing of seat 41 has a cross-section having two substantially square portions, each connected to the cross-section of one of the closure parts 43, 44. The anchor part 43A may advantageously comprise a reinforcing ring 48 having a cross-section adapted to part 43A and fitted inside part 43A. In addition, each part 43, 44 can have a curved edge adapted to abut an edge of the sectional reinforcing ring 48, as we have seen in connection with seat 31 in FIG. 7.

Alternatively, (FIG. 11) a second annular seat of flange 51, comprising a single closure part 52 analogous to part 43 in FIG. 10, can be disposed in the recess 45 of cock 42. An anchor part 53, e.g. having a rectangular cross-section is connected to closure part 42. The rectangular cross-section of anchor part 43, which can comprise an inner ring 54, extends parallel to the axis of annular seat 51. The seat can be mounted in recess 45 of cock 42 in combination with a second seat, e.g. a flat annular seat similar to seat 31 in FIGS. 6 and 7. In that case, the rectangular anchor part 53 of seat 51 can bear axially against the rectangular anchor part of the flat seat, corresponding to the anchor part 34 of seat 31.

The flat annular seat 31 in FIGS. 6 and 7 can also provide sealing-tightness for a rotating rod 61 (FIG. 12) corresponding e.g. to the rod for operating valve 2 in FIG. 3. Rod 61 may then comprise a collar 62 having a cambered cross-section and treated if necessary to increase its hardness. The resilient closure part 37 of seat 31 can resiliently abut collar 62. To this end, the anchor part 37 of seat 31 is held in a recess 63 of the valve, in an exact position with respect to collar 62, by means of bearing rings 64 subjected to the pressure of a clamping collar 65.

Figure 16:
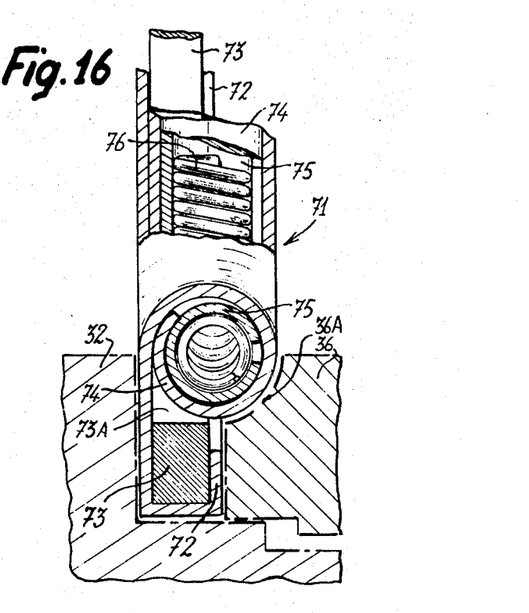

FIG. 16 shows another variant 71, of the seat according to the invention, comparable to seat 31 in FIGS. 6–8 and 13, 14. A casing anchor part 72 contains a reinforcing ring 73 similar to ring 38 in FIGS. 7 and 14. The closure part 74 has a rounded cross-section, e.g. substantially circular, completely closed in on itself, and adapted to engage laterally against a substantially cylindrical inner surface 73A of the reinforcing ring 73. Thus, the resilient crushing of closure part 74, similar to the crushing "E" of seat 31 in FIG. 14, is exactly localised and defined, owing to the exact positioning of anchor part 72 and the reaction of the curved region of part 74, bearing against ring 73.

Preferably, as we have seen with reference to FIG. 14, sectional part 36A of ring 36 exerts additional bearing force opposite the butterfly, thus further improving the accuracy of positioning and the resilient reaction of part 74.

Of course, the aforementioned various features and variants of the seat according to the invention can be combined in numerous ways.

For example, seat 41 in FIG. 9, between the two closure parts 43 and 44 having a curved cross-section, can comprise a suitably cross-sectioned bearing part of a modified reinforcing ring 81 (shown in chain-dotted lines) mounted instead of ring 48. In that case, the resilient operation of each closure part 43, 44 can be similar to the operation of the closure part 74 of seat 71 in FIG. 16, part 74 having a coiled cross-section.

Similarly in seat 71 (FIG. 16), the closure part 74, having a closed cross-section, can comprise a helical inner frame 76 having contiguous turns, similar to the helical frame 39 of seat 31 in FIGS. 7 and 14. Advantageously, frame 76 can be contained in an auxiliary casing 75 disposed between frame 76 and part 74. Circular casing 75 has a rounded cross-section, adapted to that of the closure part 74, and is e.g. split along a circular generatrix, with sufficient clearance for it to slide resiliently in the direction of the cross-section, with respect to the closure member 74, depending on the resilient crushing thereof.

The flat seat 31 in FIGS. 7 and 12, which is used for obtaining a sealing-tight contact on collar 62 of rod 61, can be associated with a sectional end (not shown) of an axial clamping ring acting on part 37 against the action of ring 62. The last-mentioned method of assembly (not shown) is the reverse of the method of assembling the sectional end 36A of the clamping ring 36 in FIGS. 14 and 16.

Of course, the closure part 37, having a curved cross-section, of seat 31 (FIG. 7) can comprise an auxiliary casing (not shown). The auxiliary casing, which is interposed between the inner helical frame 39 and the closure part 37, corresponds to the auxiliary casing 75 of seat 71 in FIG. 16 mentioned hereinbefore.

I claim:

1. A butterfly valve for high-temperature service, comprising a body formed with an axial duct having an annular shoulder and clamping means, a butterfly rotatable around an axis which is transverse with respect to the axis of said duct, said butterfly having on its periphery a spherical bearing surface whose center is at the intersection of the axis of rotation of the butterfly and the axis of said duct, said spherical bearing surface being adapted to engage an annular seat fitted in said duct, said annular seat comprising anchoring means fitted between said shoulder and said clamping means, and a rounded over wing made of a resilient metal wound on itself, one end of which is integral with said anchoring means and the other end of which is free with respect to said anchoring means, wherein said rounded over wing projects oppositely to the axis of rotation of the butterfly, said rounded over wing being capable of a resilient winding movement on itself when engaged by said spherical bearing surface, said clamping means comprising an annular curved edge adapted to retain by sliding engagement therewith the rounded over wing of said annular seat oppositely to the contact zone between the seat and the butterfly.

2. Valve according to claim 1, wherein the free end of the rounded over wing is directed toward the anchoring means.

3. Valve according to claim 1, wherein said rounded over wing has a substantially circular cross-section.

4. Valve according to claim 1, wherein a helical metal frame, the coils of which are close together, is fitted within said rounded over wing.

5. Valve according to claim 1, wherein the anchoring means of the seat has a substantially rectangular cross-section.

6. Valve according to claim 5, wherein said substantially rectangular cross-section of said anchoring means projects along a direction substantially perpendicular to the axis of the annular seat.

7. Valve according to claim 5, wherein a reinforcing ring of rectangular cross-section is inserted between said anchoring means of the seat and said clamping means.

8. Valve according to claim 1, wherein a casing of circular cross-section and having two spaced free edges defining a split along a circular generatrix is fitted within said rounded over wing.

9. Valve according to claim 1, wherein the annular seat comprises further a second rounded over wing which is coaxial with the first rounded over wing, said two rounded over wings being interconnected by common anchoring means, and said second rounded over wing being adapted to be inserted between said shoulder of the valve duct and said clamping means.

10. Valve according to claim 9, wherein said common anchoring means has two substantially square portions.

* * * * *